United States Patent [19]

Bardin

[11] Patent Number: 5,138,636
[45] Date of Patent: Aug. 11, 1992

[54] CIRCUIT FOR DETECTING RECEIVED SIGNAL LOSS IN A DIGITAL SIGNAL RECEIVER

[75] Inventor: Jean Bardin, Paris, France

[73] Assignee: Alcatel Cit, Paris, France

[21] Appl. No.: 527,478

[22] Filed: May 23, 1990

[30] Foreign Application Priority Data

May 31, 1989 [FR] France .................. 89 07180

[51] Int. Cl.⁵ .......................... H04L 7/02; H03K 5/19
[52] U.S. Cl. ......................... 375/108; 328/120; 371/65
[58] Field of Search ............ 375/108, 110; 328/120; 371/65

[56] References Cited

U.S. PATENT DOCUMENTS

| | | | |
|---|---|---|---|
| 4,363,003 | 12/1982 | Osaka et al. | 375/108 |
| 4,466,110 | 8/1984 | Kizaki et al. | 375/108 |
| 4,486,855 | 12/1984 | Duke | 364/900 |
| 4,633,193 | 12/1986 | Scordo | 375/108 |
| 4,972,442 | 11/1990 | Steierman | 375/108 |

FOREIGN PATENT DOCUMENTS 3441227  5/1986  Fed. Rep. of Germany .

OTHER PUBLICATIONS

IBM Technical Disclosure Bulletin, vol. 25, No. 7B, Dec. 1982, pp. 3956-3960, New Yor, US; D. V. Couden et al.: "Signal detection circuit for Peer-to-Peer rings".

Primary Examiner—Benedict V. Safourek
Assistant Examiner—Young Tse
Attorney, Agent, or Firm—Sughrue, Mion, Zinn, Macpeak & Seas

[57] ABSTRACT

A signal loss detection circuit, for detecting signal loss in a digital signal receiver of the type including a clock recovery circuit for reconstituting the received clock in such a manner that the loss of received signal is manifested by an absence of pulses in the reconstituted clock. A detector detects the occurrence of at least one pulse in the reconstituted clock during an observation window which has a duration equal to some predetermined number of pulses of the local clock, and a comparator compares the result of the detection with a predetermined state expected in the event of a received signal loss or in the absence of received signal loss.

5 Claims, 3 Drawing Sheets

CIRCUIT FOR DETECTING RECEIVED SIGNAL LOSS IN A DIGITAL SIGNAL RECEIVER

The present invention relates to a circuit for detecting received signal loss in a digital signal receiver.

BACKGROUND OF THE INVENTION

In a digital signal transmission system, it is nescessary, inter alia, to detect loss of signal received by the receiving equipment, such signal loss stemming either from a failure of the transmitter equipment or from a failure of the transmission medium used between the transmitter equipment and the receiver equipment.

For example, one method of doing this is described in published French patent application No. 2 525 839, and consists in performing analog integration on the received signal followed by threshold comparison, with proper reception giving rise to a constant mean value at the output from the integrator while signal loss gives rise to the output signal from the integrator decreasing or increasing in level relative to said mean value depending on whether the loss of the digital signal appears as a constant logic level "0" or "1" at the input to the receiver equipment.

The present invention makes use of the fact that a digital signal receiver includes a circuit for reconstituting the receive clock signal. There are two ways in which a receive clock signal may be reconstituted, one of which essentially makes use of a local clock which is put into phase by the transitions in the received signal, while the other of which proceeds essentially by processing the received signal directly, and more particularly by performing spectrum processing thereon in order to extract a spectrum line corresponding to the desired frequency.

Unlike the first type of circuit, a circuit of the second type produces a reconstituted clock signal which is such that a loss of the received signal gives rise to an absence of pulses in the receive clock signal, even though this property has not been sought in the past, nor has it been used to solve a particular problem.

In contrast, the present invention takes advantage of this property to solve the problem of detecting received signal loss in a particularly simple manner.

Another object of the present invention is to provide a received signal loss detection circuit which is digital, and therefore easily integrated.

Another object of the present invention is to provide a circuit enabling recovery of the received signal to be detected after a certain number of observation periods on this signal marked by absence of signal loss.

SUMMARY OF THE INVENTION

The present invention provides a circuit for detecting received signal loss in a digital signal receiver including a circuit for reconstituting the receive clock, comprising:

a local clock which is quasi-synchronous with the receive clock signal, the receive clock signal being reconstituted in such a manner as to manifest an absence of pulses in the event of received signal loss;

detector means for detecting at least one pulse of the receive clock signal during on observation window for said signal, the observation window including a determined number of pulses of the local clock signal; and comparator means for comparing the result of said detection with a predetermined state expected in the event of received signal loss or in the event of absence of received signal loss.

BRIEF DESCRIPTION OF THE DRAWINGS

An embodiment of the invention is described by way of example with reference to the accompanying drawings, in which.

DETAILED DESCRIPTION

Figure 1:
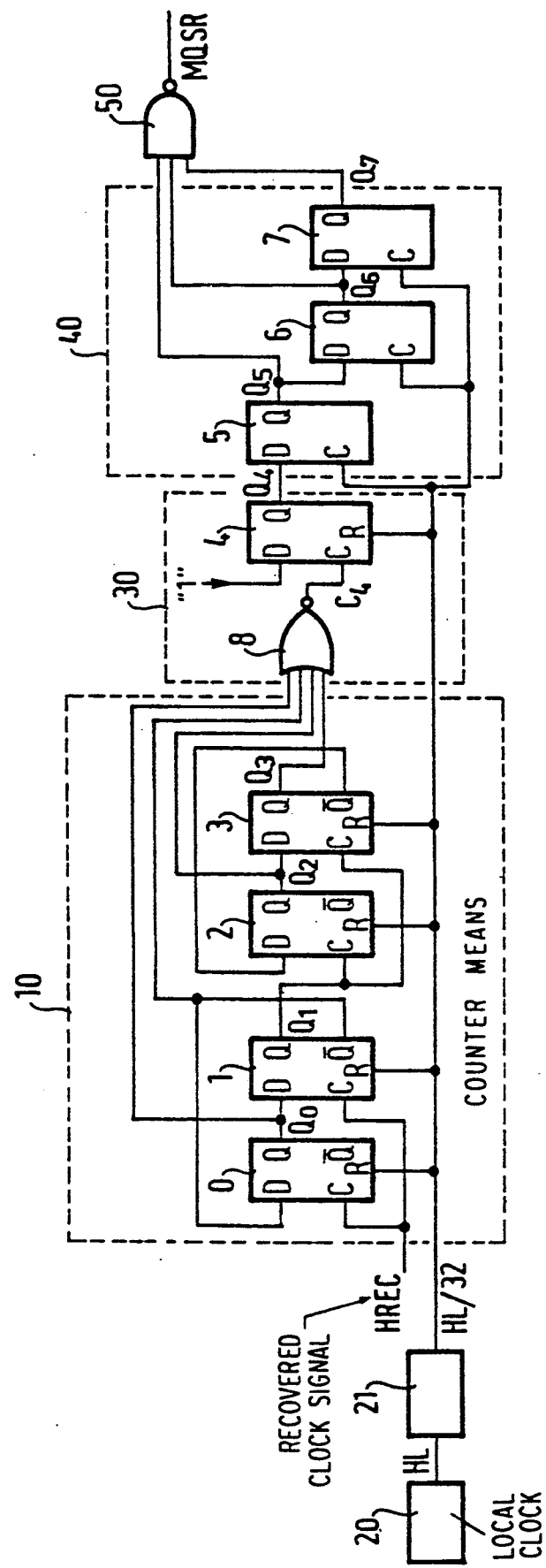
FIG. 1 is a diagram of a circuit in accordance with the invention for detecting loss or recovery of a received signal.

The circuit for detecting loss or recovery of a received signal as shown in FIG. 1 forms a portion of digital data receiver equipment (not shown) performing various functions in conventional manner, including the function of reconstituting the receive clock signal on the basis of the received data signal.

The circuit for detecting loss or recovery of the received signal in accordance with the invention makes use more particularly of a reconstituted receive clock signal HREC where loss of the received signal gives rise to an absence of pulses in the receive clock signal. Such receive clock signal reconstitution does not constitute the subject matter of the present invention and is therefore not described.

The circuit shown in FIG. 1 for detecting loss or recovery of received signal comprises counter means 10 for counting pulses of the reconstituted receive signal clock HREC lying within a count window including a number A of pulses from a local clock signal HL delivered by a local clock 20 which is quasi-synchronous with the reconstituted receive clock signal HREC. By way of example, the number A used in the description below is equal to sixteen, with a count window being itself taken to be equal to one half period of a signal HL/32 obtained by dividing the frequency of the signal HL by 32 in a frequency divider circuit 21.

The circuit for detecting received signal loss also includes means 30 for detecting the passage of said counter means through a predetermined count state which is not greater than A-1, i.e. fifteen in this case, during a count window. If the said count state is detected, then the output signal from the means 30 indicates an absence of received signal loss, otherwise received signal loss is indicated.

In the example under consideration, such detection of signal loss is performed during every other half period of the clock signal HL/32, said half period constituting said count window, with the intervening half periods being used for resetting the counter means 10 to zero.

In this case, the counter means 10 comprise a divide-by-sixteen counter, constituted by a cascade of four D-type bistables 0, 1, 2, and 3.

All of these bistables have their reset inputs R connected to receive the local clock signal HL/32.

The first two bistables, referenced 0 and 1, have their clock inputs C connected to receive the receive clock signal HREC. Bistable 0 has it D input connected to the $\overline{Q}$ output of bistable 1, while bistable 1 has its D input connected to the Q output of bistable 0. The following two bistables 2 and 3 have their clock inputs C connected to the Q output of bistable 1. Bistable 2 has its D input connected to the $\overline{Q}$ output of bistable 3, and bistable 3 has its D input connected to the Q output of bistable 2.

The counter begins to count at the beginning of a count window corresponding to a falling edge in the signal HL/32. The signals Q0, Q1, Q2, and Q3 available from the Q outputs of bistables 0, 1, 2, and 3 respectively during a count window are shown in FIGS. 2a and 2b, respectively for a count window marked by the absence of received signal loss and for a count window marked by received signal loss.

Since count state "fifteen" of this counter is the only state defined by logic state "0, 0, 0, 0" on outputs Q0, $\overline{Q1}$, Q2, Q3, the means 30 for detecting passage through count state fifteen during a count window comprise a D-type bistable 4 whose reset input R receives the local clock signal HL/32, whose D input is connected to logic level "1", and whose clock input is connected to the output of a circuit for decoding the count fifteen state, which circuit is constituted in this case by a four-input NOR gate 8 having its inputs connected respectively to the outputs Q0, $\overline{Q1}$, Q2, Q3.

Figure 2A:
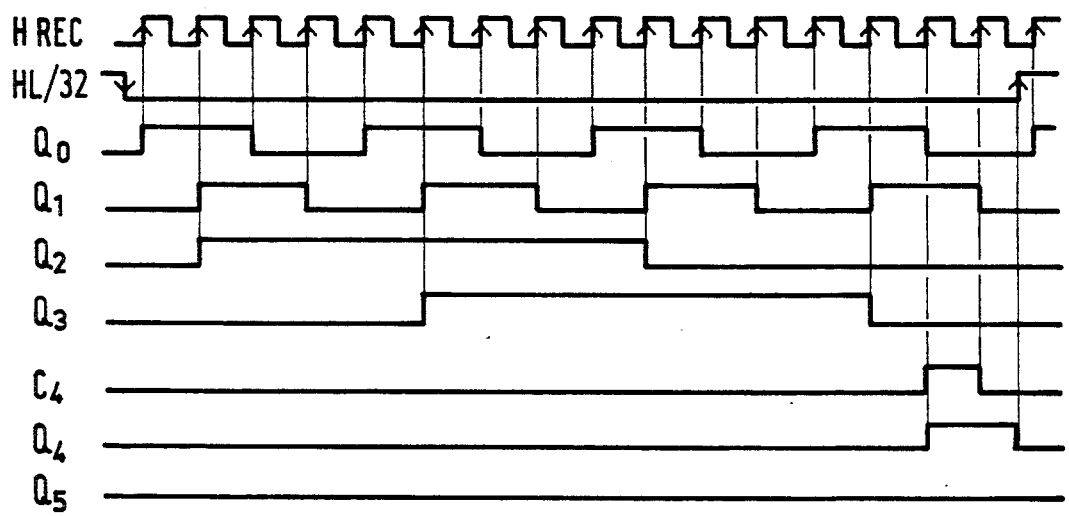
FIGS. 2a and 2b are waveform diagrams illustrating the operation of the circuit shown in FIG. 1, respectively when received signal loss is not detected and when received signal loss is detected.
Figure 2B:
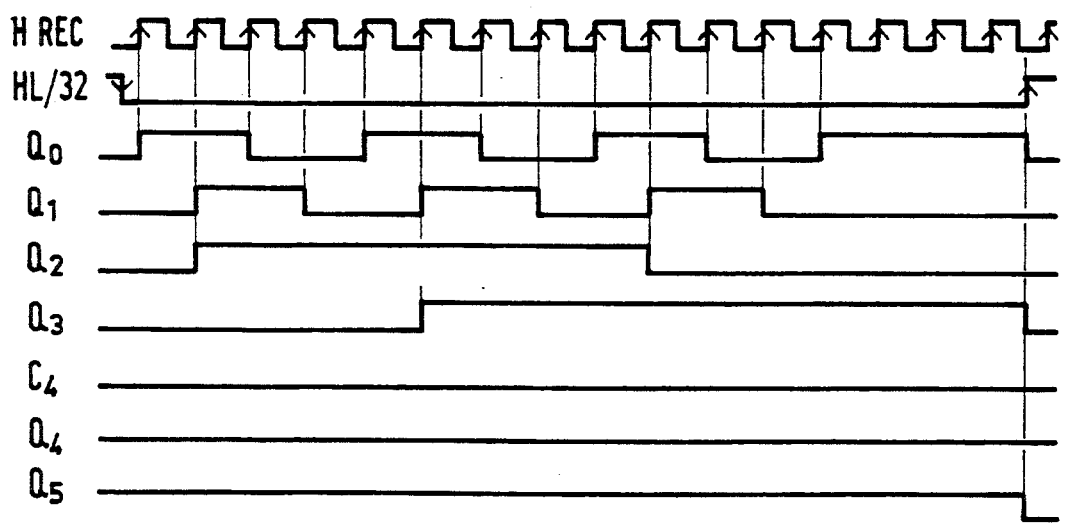

The signals C4 and Q4 available on the clock input C and on the Q output of the bistable 4 are also shown in FIGS. 2a and 2b. In the absence of received signal loss, the signal C4 is at logic level "1" between the leading edge of the fifteenth pulse and the leading edge of the sixteenth pulse in the signal HREC, and the signal Q4 is at logic level "1" between the leading edge of the fifteenth pulse in the signal HREC and the rising edge in the signal HL/32 which corresponds to the end of the count window, which may occur, a priori, at any moment during the sixteenth pulse of the signal HREC (since the signals HREC and HL are quasi-synchronous).

The signal Q4 constitutes the output signal from the detector means 30. If the received signal is lost, then the signal Q4 is at logic level "0" a the end of the count window.

In order to detect recovery of the signal, after signal loss has been detected, the circuit shown in FIG. 1 further includes means 40 for storing the output signal from the detector means 30 over three consecutive count windows, and means 50 for detecting a state of the signal stored in this way corresponding to an absence of received signal loss during each of three consecutive windows, in which event the output signal from the detector means 50 indicates that the received signal is present, otherwise this signal continues to indicate loss of received signal.

The storage means 40 comprises a shift register constituted by three D-type bistables 5, 6, and 7. These three bistables have their clock inputs C connected to receive the local clock signal HL/32. The D input of bistable 5 is connected to the Q output of bistable 4, the D input of bistable 6 is connected to the Q output of bistable 5, and the D input of bistable 7 is connected to the Q output of bistable 6.

The detector means 50 constituting a cirucit for decoding the "0" state of the signal Q4 over three consecutive count windows is itself implemented in the form of a three-input NAND gate having its inputs connected respectively to output Q5 of bistable 5, output Q6 of bistable 6, and output Q7 of bistable 7.

Figure 3:
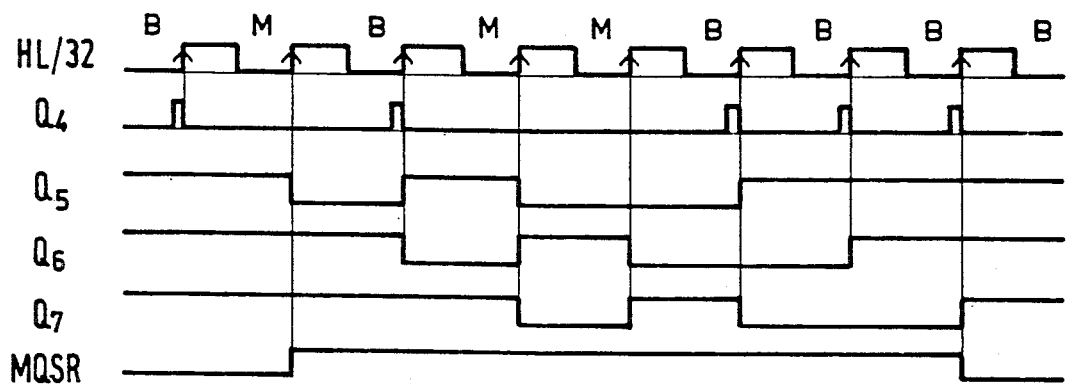
FIG. 3 is a waveform diagram showing the operation of the FIG. 1 circuit during recovery of the received signal.

The waveform diagram of FIG. 3 shows, by way of example, the states of the signals Q4, Q5, Q6, and Q7 over eight consecutive count windows. In each of these windows, a detected loss of received signal is marked by reference M and a detected absence of received signal loss is marked by reference B. By way of example a succession MBMMBBBB is shown, which is assumed to follow a B state corresponding to the end of an extended period during which signal was being received.

As shown in FIG. 3, the signal MQSR at the output from NAND gate 50 is initially at logic level "0" (for a state corresponding to good signal reception), said signal MQSR switching from level "0" to level "1" at the end of the first count window marked by the M state, and returning to level "0" only after three consecutive count windows marked by a B state, thus providing means for detecting loss or recovery of the received signal.

Figure 4:
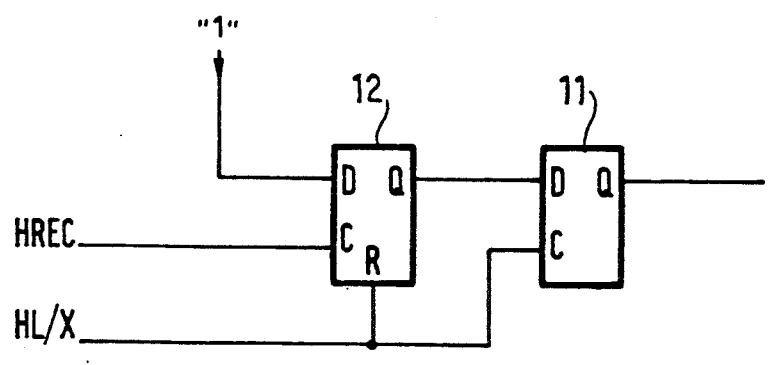
FIG. 4 is a diagram of another received signal loss detection circuit in accordance with the invention.

FIG. 4 is a circuit diagram of another example of a circuit for detecting received signal loss. This example is a variant of that shown in FIG. 1, in which the counter means 10 and the means 30 for detecting the passage of these counter means through a predetermined state are replaced by means for detecting at least one received clock signal and by means for comparing the result of this detection with a predetermined state of the received signal expected in the event of received signal loss or in the event of absence of such loss.

These detection means comprise a D-type bistable 12 whose clock input C receives the reconstituted receive clock signal HREC, whose D input is connected to logic level "1", and whose reset input R receives a clock signal HL/X (where X is equal to 32 in the case shown in FIG. 1).

The circuit shown in FIG. 4 also includes a D-type bistable 11 whose D input is connected to the Q output of the bistable 12, and whose clock input C receives the signal HL/X. This bistable 11 stores the result of the detection performed by the bistable 12 over the period of one observation window of duration HL/X.

When at least one pulse in the signal HREC is detected over an observation window, then the output signal from the bistable 11 relating to said observation window is at logic level "1". Otherwise it is at logic level "0". This thus makes it possible to perform the above-mentioned comparison operation.

The value selected for X, i.e. the duration of the window during which the signal HREC is observed, determines the sensitivity of such a circuit to detecting received signal loss or absence of such loss. The same applies in the circuit shown in FIG. 1 to the choice of count state from which it is decided that the received signal has been lost or not.

I claim:

1. A signal loss detection circuit for detecting received signal loss, in a digital signal receiver including a clock recovery circuit for reconstituting a receive clock signal, said signal loss detection circuit comprising:
   a local clock circuit for generating a local clock signal which is quasi-synchronous with the receive clock signal, the receive clock signal being reconstituted in such a manner as to manifest an absence of pulses in the event of received signal loss;
   first detector means for detecting at least one pulse of the receive clock signal during a predetermined time interval, referred to as an observation window, the observation window having a duration including a determined number of pulses of the local clock signal; and comparator means for comparing the result of said detection with a predetermined state expected in the event of received signal loss or in the event of absence of received signal loss, an output of said comparator means comprising an output of said signal loss detection circuit and indicating presence or absence of received signal loss.

2. A signal loss detection circuit according to claim 1, wherein the first detector means comprises counter means for counting pulses of the receive clock signal during said observation window, said observation window comprising a predetermined number of consecutive periods of the local clock signal; and the comparator means comprises second detector means for detecting a predetermined count value in said counter means during said observation window, said predetermined count value representing a number less than said predetermined number, in which case the output signal from said second detector means indicate absence of received signal loss, whereas otherwise the output signal from said second detector means otherwise indicates received signal loss.

3. A signal loss detection circuit according to claim 2, further comprising:

storage means for storing the output signal from said second detector means over a plurality of consecutive observation windows; and third detector means for detecting a state on the signals stored in said storage means corresponding to absence of received signal loss over each of the observation windows under consideration, in which case the output signal from said third detector means indicates that the signal is being received, whereas otherwise the output signal from said third detector means indicates that the received signal has been lost.

4. A signal loss detection circuit according to claim 3, wherein the number of consecutive observation windows is equal to three.

5. A signal loss detection circuit according to claim 1, wherein said determined number is greater than 1.

* * * * *